Nov. 20, 1928.
F. H. MONTREUIL
1,692,682
APPARATUS FOR COOKING AND OTHER PURPOSES
Filed Dec. 27, 1924
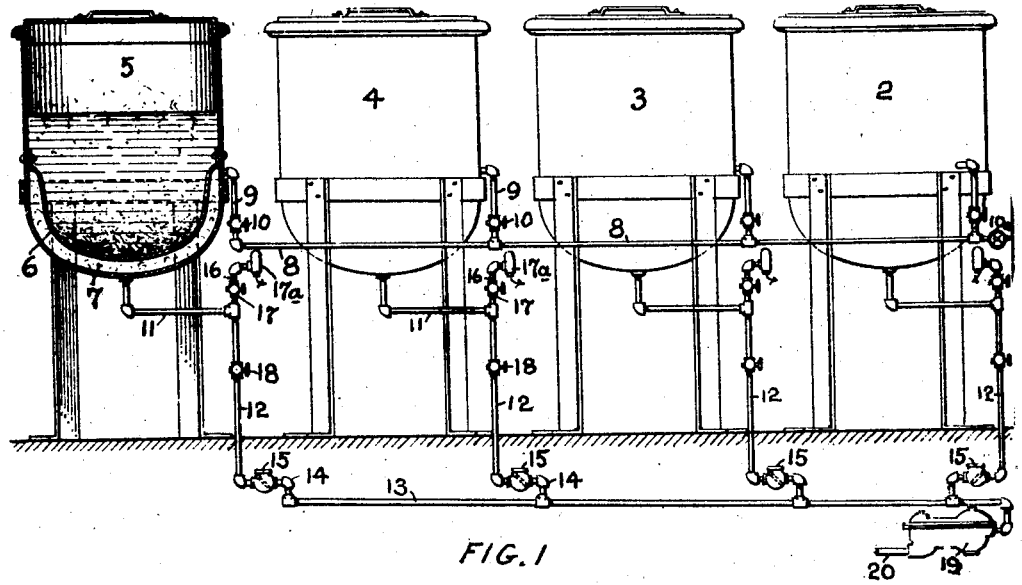
FIG. 1
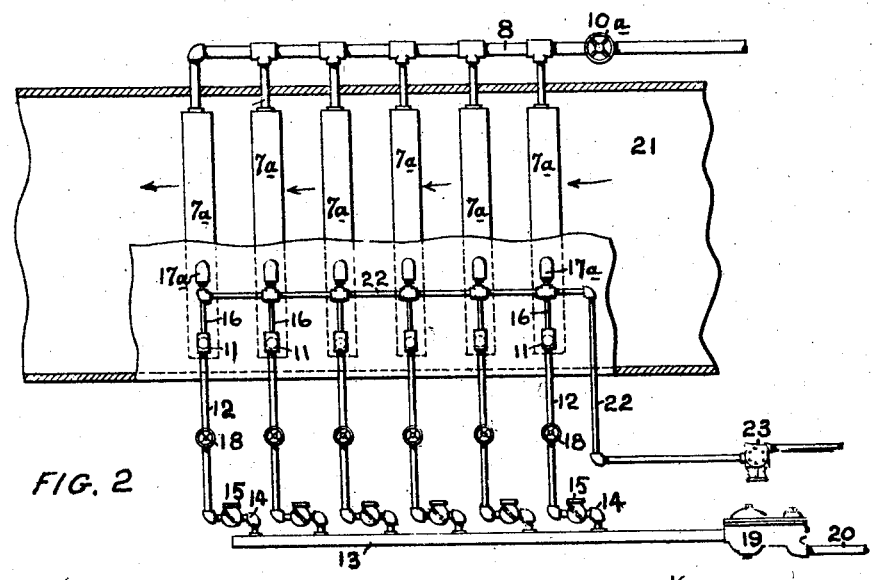
FIG. 2
Inventor.
Frank H. Montreuil.
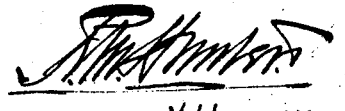
By
Attorney.

Patented Nov. 20, 1928.

1,692,682

UNITED STATES PATENT OFFICE.

FRANK H. MONTREUIL, OF CHICAGO, ILLINOIS, ASSIGNOR TO WARREN WEBSTER & COMPANY, A CORPORATION OF NEW JERSEY.

APPARATUS FOR COOKING AND OTHER PURPOSES.

Application filed December 27, 1924. Serial No. 758,332.

The object of my invention is to provide a system of heating adapted to steam heated vessels for cooking and other purposes which may be operated in multiple from a common source of steam supply, and also having a common drainage system for water of condensation and including a suitable steam trap to permit the passage of water but restricting the escape of steam, the said system being so constructed on the return or drainage side that it provides independent static heads for the steam heated vessels whereby the drainage of water of condensation is assured notwithstanding a material difference in the steam pressure in the respective vessels, it being also understood that the air from the respective vessels and their drainage pipes may be vented either by hand regulation or by an automatic air valve which permits the passage of air but restricts the escape of steam.

More particularly, this invention operates in such manner that the sum of the pressure in any of the heating or cooking vessels and the static head on the drainage side thereof are equal, or substantially so, with the corresponding pressures in the other heating units when in operation, so that there is also a substantially constant differential in pressures between the common supply pipe and common return pipe of the system and across each of the heating units, no matter what the internal steam pressure of those units may be. The utility of a system of this character is the insurance of automatic control in the supply of steam and removal of water of condensation notwithstanding the difference in actual pressures within the steam heated vessels. For example, where one of the vessels is supplied with cold fluid which is to be heated while heated fluids are in others of the vessels, it is manifest that the condensation of the steam supplied to the vessel holding the cold fluid will occur to such a degree that the actual steam pressure within the heating compartment thereof will be less than the steam pressure in connection with the vessels containing the heated fluid and, therefore, to prevent the higher pressure from those vessels providing in the common return pipe a higher pressure than that in the vessel receiving the cold fluid, the drainage from that vessel automatically builds up in its drainage pipe a static head which, together with the pressure in the vessel itself, just balances the differential pressure between the supply and return sides of the system and which may be considered as equalling that within the vessels containing the heated fluid.

As a further refinement of the method and apparatus, the building up of the static head in the return pipe of any one of the steam heated vessels is independent of the pressure in any of the other steam heated vessels, except so far as the higher pressures dominate the pressure in the common return pipe, and to secure this result a check or automatic valve is arranged at the bottom of each of the drain pipes and above which the static head is formed, said valves remaining closed under the superior pressure in the common return pipe until the static head, corresponding to the vessel having the lower pressure, accumulates whereby its pressure supplemented by the steam pressure substantially equals the pressure in said common return, and thereby insures a sufficient passage of water to remove the excess but not destroy the effective static head. It will be understood, however, that where the contents of the vessels are of different temperatures and consequently provide different steam pressures in the heating chambers, their temperatures may be varying according to the conditions or changes of the fluids supplied to the vessels and, therefore, a vessel having the greatest static head at one time may have the least static head at another time, the said head becoming less and less as the temperature of the fluid increases and the steam pressure employed also increasing correspondingly.

In the case of cooking vessels, such as has been referred to above, the temperatures of the vessels naturally change with the contents and, therefore, there is no definite relative degree of temperature as between the respective series of vessels. However, in some applications of the method herein described, the series of heating vessels or chambers may severally be subjected to gradually warmer conditions and in that event, the pressures within the heating vessels will be respectively in an increasing ratio from one end of the series to the other and consequently the static heads maintained will be in decreasing ratio and the sum of the steam pressures of the respective vessels and the corresponding static heads will all equal each other, and will be substantially maintained during the operation of the apparatus and the pressure differential between the steam supply and common return pipe will be constant and equal in all cases.

With the above and other objects in view, the nature of which will be more fully understood from the description hereinafter, the invention consists in the novel construction of apparatus and method of cooking and other purposes, as hereinafter more fully described and defined in the claims.

Referring to the drawings: Fig. 1 is a general illustration of apparatus embodying my improvements as applied to cooking or heating vessels; and Fig. 2 is a diagram illustrating a modified form of apparatus wherein the several heating vessels are subjected to successive treatment by the same medium to be heated.

2, 3, 4 and 5 represent four steam heated cooking utensils of any suitable construction, in the present instance being shown as an outer metal body having an inner copper pot lining 6 providing a steam space 7 between it and the outer shell, as more fully shown at the left hand end of Fig. 1. Steam is supplied to the several steam spaces 7 by a steam main 8 leading from any suitable source of live or exhaust steam, as preferred, the delivery of steam from said main 8 to the respective heating chambers 7 being accomplished by branch pipes 9 having shut-off or control valves 10. If desired, in cases where all of the heaters are in operation continuously, a common shut-off or control valve 10ª may be employed for controlling the steam to all of said heaters; and said valve 10ª may also be employed with the valves 10 as the latter enables the disconnection of one of heating utensils for repairs without interfering with the normal operation of the remaining utensils.

The drainage of the steam heating chambers 7 of the several utensils is secured by providing a separate controlled communication from said chambers to a common return main 13, from which the water of condensation may be delivered to a suitable trap 19 which automatically operates to discharge the surplus water from the return or drainage side of the system into a pipe 20 which may conveniently discharge to the sewer or to a pump for delivery to the boiler (not shown) or wherever desired. The separate controlled communication from each heating space 7 to the return main 13, comprises a drain pipe 11 from the bottom of the utensil discharging into an upright or stand-pipe 12 in which the static head is maintained automatically to the extent required, said stand-pipe having a check valve 15 at its lowest part and from which the water of condensation passes by a pipe 14 opening into the return or common drainage main 13. The check valve 15 is so arranged that it closes, due to excess pressure in the drainage main 13, and opens when the combined steam pressure in the heating space 7 and pressure due to the static head pipe 12 exceeds the pressure in the said drainage main 13. A shut-off valve 18 may be arranged in the pipe 12 or at a place in the drainage piping somewhere between the utensil and the check valve so that said piping may be shut off in case of the temporary removal of the utensil for repairs.

It is further necessary to provide means to prevent the piping or utensils becoming air bound and such means are conveniently supplied by a vent pipe 16 from the upper part of the stand-pipe 12 and having an air vent valve 17 and preferably supplemented by an automatic air valve 17ª of any operative construction which acts to permit the escape of air but retards or prevents the escape of steam. Such automatic air valves are usually of the thermostatic type and are so well known as not to require any detailed description. Both air valves 17 and 17ª may be employed at the same time, as the hand valve 17 may be resorted to in case of repairs to the automatic air valve 17ª being necessary.

The method of operation will now be understod to take place as follows: Assuming that the steam under a given pressure is supplied to the utensils 2, 3, 4 and 5, this pressure will be reduced in the steam heating spaces 7 according to the rate and extent of condensation occurring and will usually vary in the several heating units. If we assume that utensils 2, 3 and 5 are operating in a fully heated condition and hence with a maximum pressure and minimum of condensation, the water therefrom will be delivered to the drainage main 13 at a pressure approximating that in the chambers 7 of those utensils and this pressure will exert itself upon the undersides of the check valve 15 of the utensil unit 4 to prevent its opening until that pressure is overbalanced. If, also, we assume that the utensil 4 has been charged with a cold fluid, it will follow that the steam pressure in its steam heating chamber 7 will be less than that existing in the heating chambers of the other units. If this lesser steam pressure is not supplemented automatically to equal that of the other utensils, the condensate will not drain through the check valve into the drainage main 13 and the heating chamber 7 will become clogged with water, reducing its efficiency as a heater. The water will also escape through the automatic air valve 17ª, if used, and thus make a mess and loss in addition to impairment of the chamber 7 as a heater. To prevent these objectionable conditions, the static head automatically builds up in the stand-pipe 12 of utensil unit 4 until it provides a static pressure due to the water column above the check valve which, together with the steam pressure in the heating chamber 7 of this unit, is slightly greater than that in the main 13, whereupon the excess of water of condensation above the necessary static head is automatically passed through the valve 15 into the main 13. It is important to note that this static head automatically varies inversely with the changes in pressure within the chamber 7 and hence when the cold fluid gradually becomes heated, the condensation of steam will become gradually lessened in quantity, the pressure will slowly rise and the static head gradually and automatically lower until the condition of unit 4 becomes normal with the others, in which case the static heads of all the units will be the same. However, the emptying and refilling of the several units at different times, or requirements necessitating the fluids to be heated to different temperatures, will cause them to automatically vary their respective static heads and prevent under any operation, a failure to clear the system of objectionable water of condensation.

It will also be understood that while a pressure system, as here outlined, required the condensate to flow through the pipes 12 by gravity, this flow is necessarily controlled under the pressure differential in the drainage main 13 and the steam pressure in the respective heating chambers 7, said respective differentials determining the extent of the corresponding static heads in pipes 12 which are to be automatically maintained to cause the excess condensate to flow by gravity in each case commensurately with its accumulation. It is further understood that a constant minimum pressure differential between the steam pressure in the supply main 8 and the pressure in the drainage main 13 is maintained, consistent with proper steam consumption to insure the heating requirements.

In the foregoing description, I have explained the use of my invention in a case wherein the greatest variation and irregularity in heating is liable to happen by reason of the fact that each unit 2, 3, 4 and 5 performs its own special function, but in other cases of the use of my invention, the relative heating of the respective steam heaters is maintained under more regular and uniform conditions. For example, taking a case, such as shown in Fig. 2, wherein 7$^a$ represents a large number of heaters arranged side by side in a conduit 21 and over which an air current is passing, as indicated by the arrows, the steam is supplied to the heaters by the pipe 8 and its branches and the condensate drainage therefrom is automatically delivered to the drainage or return main 13 through the static heads and otherwise as in Fig. 1. In this case, I have shown the discharge from the air valves 17$^a$ received in an air exhausting main 22 in which a partial vacuum may be maintained by vacuum pump 23, though I do not limit myself in this respect. If we assume that the cool air first strikes the heater 7$^a$ to the right, it follows that the greatest condensation will occur in that heater and that the steam pressure therein will be the lowest of the series of the heaters. As the air is being heated more and more as it passes over the successive heaters, the heater to the left of the series will provide the least condensate and the steam pressure therein will be the greatest. This relative condition of the heaters will continue with reasonable uniformity, even through changing temperature conditions of the air supplied may vary. Under these conditions of operation, it follows that the static heads corresponding to the several heaters will differ, being the greatest with the right hand heater and least with the left hand heater; and in every case, being such that the combined steam pressure in the heater and the pressure of its static head will be equal to the corresponding combined steam pressure and static head of each of the other heaters, and whereby the pressure differentials under which all the heaters operate are the same or substantially so.

In giving the foregoing examples of the utility of my invention, I wish it to be understood that the same automatic results may be had when my invention is applied to heating cylinders of slashers and of paper making machines, and I, therefore, do not confine the use of my improvements to the special examples elucidated.

I have described my improved apparatus and method in that particularity which I deem to be the best exposition of my invention, and that which I prefer in commercial practice, but I do not restrict or confine myself to the minor or secondary details, as such are susceptible of modification and may be resorted to as matters of mechanical skill and without a departure from the spirit of the invention.

Having now described my invention, what I claim as new and desire to secure by Letters Patent is:

1. In apparatus of the character stated, a plurality of steam heated units and a common source for supplying steam to the several units, in combination with a drainage main common to all of the heating units for receiving the water of condensation therefrom, a trap for normally sealing the drainage main but permitting the escape of water therefrom, and a plurality of connecting means each between said drainage main and one of the heating units each connecting means comprising a stand-pipe receiving water of condensation from the lower part of the heating unit and at its bottom connecting with the drainage main and further provided with a check valve at the bottom of the stand-pipe for permitting water to pass therefrom into the drainage main but prevent the passage of water from the drainage pipe into the stand-pipe, and means for permitting the escape of air from the upper portion of the stand-pipe.

2. The invention according to claim 1, wherein further, the means for permitting the escape of air from the respective stand-pipes consists of a thermostatically operated valve.

3. The invention according to claim 1, wherein the height of each of the stand-pipes is such as to enable a static head to be produced therein which, together with the pressure of the steam supplied to the corresponding heating unit, provides a pressure upon the check valve sufficient to open it for the passage of the excess water from the stand-pipe.

4. The invention according to claim 1, wherein the height of each of the stand-pipes is such as to enable a static head to be produced therein which, together with the pressure of the steam supplied to the corresponding heating unit, provides a pressure upon the check valve sufficient to open it for the passage of the excess water from the stand-pipe, and the means for permitting the escape of air from the several units consists of a thermostatically operated air vent valve for each unit, and an exhausting means common to all of said thermostatic air vent valves.

5. In an apparatus of the character stated, a plurality of heating units and means for supplying steam to said units from a common source, in combination with a closed drainage main provided with automatic means for removing excess accumulations of water therefrom, said main in separate communication with each of the heating units by stand-pipes providing independent static heads capable of counter-balancing the excess of steam pressure in any of the heating units over the steam pressure in any of the other heating units whereby the total pressure comprising the sum of the steam pressure and static head in any one heating unit equals the total pressure in each of the other heating units, separate automatic valves between the drainage main and each of the stand-pipes for permitting water to pass from said stand-pipes into the drainage main but preventing flow in the opposite direction, and separate means for permitting the escape of air from the upper parts of each of the stand-pipes.

In testimony of which invention, I hereunto set my hand.

FRANK H. MONTREUIL.